Feb. 28, 1950  S. E. BARTELSON  2,499,210
FILM DRIVE FILTER
Filed Dec. 31, 1946

INVENTOR.
Sten E. Bartelson
BY
Val R. Gorham
ATTORNEY

Patented Feb. 28, 1950

2,499,210

UNITED STATES PATENT OFFICE 2,499,210

FILM DRIVE FILTER

Sten E. Bartelson, Ashland, N. J., assignor to Radio Corporation of America, a corporation of Delaware Application December 31, 1946, Serial No. 719,397

4 Claims. (Cl. 271—2.3)

This invention relates to sound film apparatus, and particularly to film advancing mechanisms which provide a constant and uniform speed of the film at a light translation point.

Many types of film drive mechanisms for the purpose of obtaining a constant and uniform speed of the film past a light beam, either for recording a sound record on the film or for reproducing a sound record thereon, have been suggested and used. Many of these systems employ special filters for the drive sprocket, special types of filters for the drum over which the film is pulled ahead of the drive sprocket, or special idler or jockey rollers between the sprocket and the drum. Many of these filters consist of springs and friction dampers, magnetic drives, spring and dash pots, and oil damped flywheels. Most of these filters are not only bulky and consume considerable space, but they are expensive to build and maintain.

The present invention is directed to a filter for the purpose of smoothing out film speed irregularities between the drive sprocket and the film pulled drum, and is one which is simple, economical, and efficient. It utilizes a roller in the film loop between the sprocket and drum and to which is attached a resilient element in the form of a flat spring which is covered by damping material, preferably of rubber composition, although other materials, such as mica and cloth, may be used. Such a filter requires a small amount of room, and the damping will stay constant over long periods as compared with such damping devices as dash pots, friction pads, and bearings. The filter minimizes the oscillatory movements of the usual flywheel attached to the shaft of the drum due to the elasticity of the film and the mass of the flywheel.

The principal object of the invention, therefore, is to facilitate the obtaining of a constant film speed past a light beam.

Another object of the invention is to provide an improved film drive system which is simple and economical.

A further object of the invention is to provide an improved filter for a film advancing mechanism.

A still further object of the invention is to provide an improved jockey roller filter utilizing a spring covered by damping material.

Figure 1:
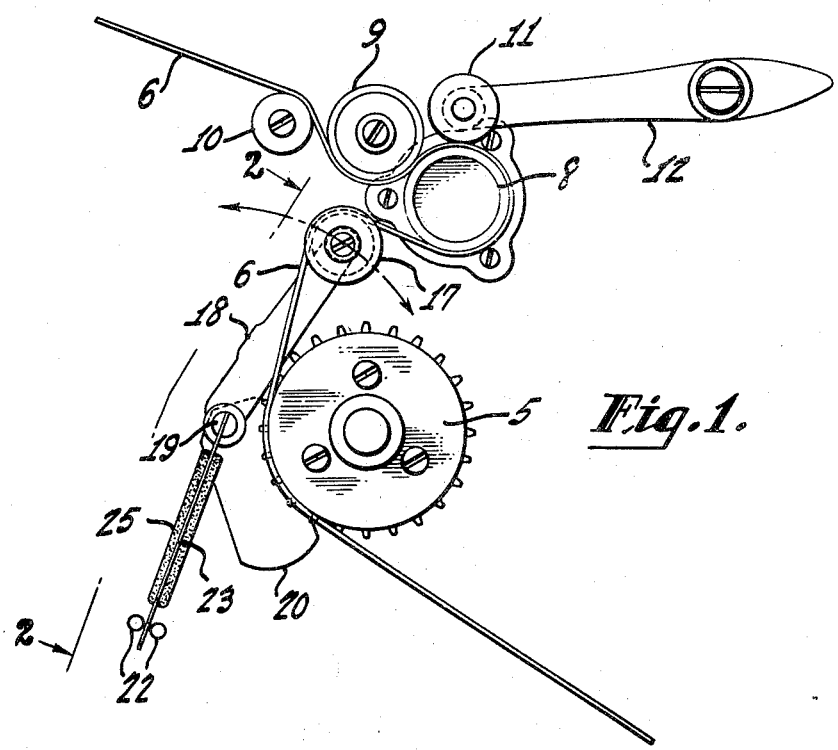
Figure 2:
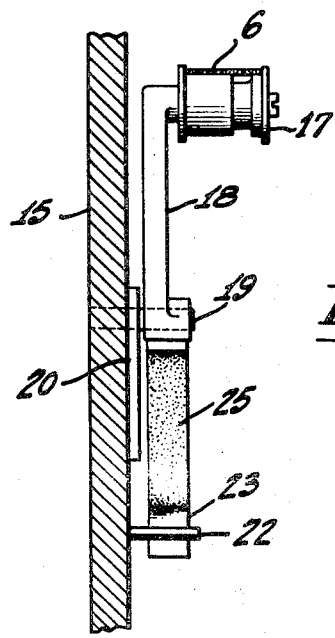

Although the novel features which are believed to be characteristic of this invention will be pointed out with particularity in the appended claims, the manner of its organization and the mode of its operation will be better understood by referring to the following description read in conjunction with the accompanying drawings, forming a part hereof, in which:

Fig. 1 is a front elevational view of the essential film drive elements embodying the invention, and Fig. 2 is a side elevational view taken along the line 2—2 of Fig. 1.

Referring now to the drawings, in which the same numerals identify like elements, a constant speed drive sprocket 5 pulls a film 6 over a drum 8 which has a flywheel (not shown) on the shaft thereof. Guiding the film to the roller 8 are rollers 9 and 10, while a pressure roller 11, mounted on an arm 12, maintains the film at a predetermined pressure on the drum 8. The various sprocket and rollers just described may be mounted on a mounting plate or casting 15 in the usual manner.

Positioned in the film loop intermediate the sprocket 5 and drum 8 is an idler or jockey roller 17 mounted on an arm 18 pivoted on a shaft 19 in the wall 15. A plate 20 aids in mounting the shaft 19. Attached to the arm 18 and having one end positioned between a pair of stops 22 is a flat spring element 23 on either side of which is glued, or otherwise attached, a damping element, such as a sheet of rubber 25, although, as mentioned above, such material as mica or cloth may also be used.

It has been found that a type of synthetic material known as "Viscaloid" gives good results. Such a damping element provides constant damping over long periods of time whereas dash pots and friction pads have a tendency to vary during periods of use. Such a filter is inexpensive to manufacture, and is suitable for providing constant film motion in small recording and reproducing equipments.

I claim:

1. A film drive mechanism comprising a sprocket adapted to advance film thereover, a drum over which film is pulled by said sprocket, a roller intermediate said sprocket and drum over which said film passes, a movable arm on which said roller is mounted, a pivot for said arm, and a leaf type spring having dampening material thereon attached at one of its ends to said arm for rotation therewith, the opposite end of said spring being free, and stops disposed adjacent the free end of said spring for limiting the movement thereof as said arm rotates.

2. A film drive mechanism in accordance with claim 1, in which said spring means consists of a flat spring adapted to be convexed with movements of said roller, said resilient material covering the sides of said spring.

3. A film drive filter comprising a roller adapted to be positioned in a film loop intermediate a film sprocket and film pulled drum, an arm for supporting said roller on one end thereof, the other end of said arm being pivoted to permit rotation of said arm, a leaf type spring carrying dampening material and having one end attached to said arm at said pivot point, the other end of said spring being unattached, and a pair of stops on each side of said spring at the unattached end thereof for limiting the rotational movement of said end of said spring and permitting free substantial longitudinal movement thereof.

4. A film drive filter in accordance with claim 3, in which damping material is attached to the sides of said spring.

STEN E. BARTELSON.

REFERENCES CITED

The following references are of record in the file of this patent:

UNITED STATES PATENTS

| Number | Name | Date |
|---|---|---|
| 1,892,554 | Kellogg | Dec. 27, 1932 |
| 2,102,895 | Hasbrouck | Dec. 21, 1937 |
| 2,157,393 | Black | May 9, 1939 |
| 2,166,326 | Riesz | July 18, 1939 |